United States Patent [19]

Kiehlbauch et al.

[11] Patent Number: 5,081,166

[45] Date of Patent: * Jan. 14, 1992

[54] PROCESS FOR PRODUCING A STABILIZED LATEX EMULSION ADHESIVE

[75] Inventors: Richard A. Kiehlbauch, Racine, Wis.; Vince S. Volk, Highland Park, Ill.; Lee W. Morgan, Racine, Wis.; Richard J. Esser, Nieuwkoop, Netherlands; Dennis P. Jensen, Racine, Wis.

[73] Assignee: S. C. Johnson & Son, Inc., Racine, Wis.

[*] Notice: The portion of the term of this patent subsequent to Jan. 16, 2007 has been disclaimed.

[21] Appl. No.: 609,049

[22] Filed: Nov. 2, 1990

Related U.S. Application Data

[63] Continuation of Ser. No. 416,296, Oct. 2, 1989, abandoned, which is a continuation-in-part of Ser. No. 184,480, Apr. 21, 1988, Pat. No. 4,894,397.

[51] Int. Cl.$^5$ .................. C08F 9/00; C08F 265/04; C08G 9/00; B32B 3/10
[52] U.S. Cl. .................. 523/201; 525/308; 428/137
[58] Field of Search .................. 523/201; 525/308; 428/137

[56] References Cited

U.S. PATENT DOCUMENTS

| | | | |
|---|---|---|---|
| 3,244,655 | 4/1966 | Sullivan et al. | 524/460 |
| 3,399,080 | 9/1968 | Vitkuske et al. | 428/454 |
| 3,401,134 | 9/1968 | Fantl et al. | 524/819 |
| 3,404,116 | 10/1968 | Pueschner et al. | 524/446 |
| 4,151,143 | 4/1979 | Blank et al. | 524/533 |
| 4,179,417 | 12/1979 | Sunada et al. | 525/444.5 |
| 4,226,752 | 10/1980 | Erickson et al. | 524/460 |
| 4,515,914 | 5/1985 | Tsurumi et al. | 523/201 |
| 4,628,071 | 12/1986 | Morgan | 524/832 |
| 4,894,397 | 1/1990 | Morgan et al. | 523/201 |

FOREIGN PATENT DOCUMENTS 814528 6/1969 Canada .

OTHER PUBLICATIONS

Colloque International sur la Copolymerisation et les Copolymeres en Emulsion, Mar. 1984, pp. 377-386 & 387-390—and the English translation titled: Emulsion Copolymerization, reprinted from Makromol. Chem., Suppl. 10/11, 359-390 (1985), pp. 24-31.

See also "Bibliographie" of the English-language Translation, Journal of Polymer Science: The Formation of 'Inverted' Core-Shell Latexes by D. I. Lee and T. Ishikawa in the Polymer Chemistry Edition, vol. 21, at pp. 147-154, published 1983.

J.A.P.S. Article: "Preparation of Carboxylated Polymer Emulsion Particles in Which Carboxyl Groups Are Predominantly Localized at Surface Layer by Using Seeded Emulsion Polymerization Technique", by Masayoshi et al., Synopsis, p. 1.

S. Muroi Article: "Internal Structure of Latex Particles Formed by [Two]-Stage Feed Polymerization of Ethyl Acrylate-Methacrylate Acid Mixture", p. 1, 2nd para.

Polymer Article: "Properties and Structure of Elastomeric Two-Stage Emulsion Interpenetrating Networks" by Narkis et al., see Abstract, pp. 1-2.

Journal of Applied Polymer Science Article: "Morphology of Latex Particles Formed by Poly(methyl Methacrylate)-Seeded Emulsion Polymerization of Styrene", from vol. 30, pp. 1903-1926 of J.A.P.S., see also Synopsis, p. 1903, first sentence by Cho et al.

*Primary Examiner*—Nathan M. Nutter

[57] ABSTRACT

An improved process for producing stabilized core-shell latex emulsion adhesives is disclosed. In a process which comprises preparing a hydrophilic polymer and thereafter contacting the hydrophilic polymer with a hydrophobic monomer for producing an inverted core-shell latex emulsion, the improvement comprises the additional step of adjusting the pH of the inverted core-shell latex emulsion for dissolving the hydrophilic polymer, thereby to produce a stabilized latex emulsion adhesive.

21 Claims, No Drawings

PROCESS FOR PRODUCING A STABILIZED LATEX EMULSION ADHESIVE

REFERENCE TO RELATED APPLICATION

This is a continuation of co-pending application Ser. No. 07/416,296 filed on Oct. 2, 1989, now abandoned, which application is a continuation-in-part of U.S. patent application Ser. No. 07/184,480 filed Apr. 21, 1988, now U.S. Pat. No. 4,894,397, the benefit of which is now claimed for purposes of priority pursuant to 35 U.S.C. § 120.

BACKGROUND OF THE INVENTION

This invention relates to stable, aqueous latexes and to methods for their preparation.

Aqueous dispersions of polymers, which are referred to as "latexes" in the art, are generally known to be useful, both alone and in a variety of formulations, as, for example, coatings and impregnants. A wide variety of latexes of various homopolymeric and copolymeric compositions (such as styrene-butadiene copolymers, acrylic homopolymers and copolymers, vinylidene chloride homopolymers and copolymers, etc.) have been developed having specific chemical and/or mechanical properties for particular end use applications.

In particular, aqueous interpolymer latexes resulting from the emulsion-polymerization of: certain monovinyl aromatic monomers such as styrene; certain diolefins such as butadiene; and certain monoethylenically-unsaturated carboxylic acids such as acrylic acid, are known to be particularly useful as film-forming binders for pigments in various paper-coating applications. See, for example, U.S. Pat. No. 3,399,080 to Vitkuske and U.S. Pat. No. 3,404,116 to Pueschner et al. Such emulsion polymerization reactions may also optionally employ conventional seeding procedures to obtain optimum control of polymerization and, therefore, maximum product uniformity (e.g., narrow particle size distribution).

U.S. Pat. No. 4,151,143 to Blank et al., moreover, discloses a so-called "surfactant-free" polymer emulsion coating composition and a method for preparing the same. Blank et al. point out that one problem associated with emulsion polymerization-produced polymers that are employed for coatings is the presence of certain surfactants. That is, certain surfactants, while employed to stabilize emulsions, tend to adversely affect the water-resistance and/or corrosion-resistance of the resulting film as well as the adhesion of the coating especially to metal surfaces. The Blank et al. emulsion polymers, furthermore, are prepared in a so-called "two-stage" process. The process includes a first stage and a second stage. In the first stage, a conventional carboxyl group-containing polymer is prepared either by a conventional solution-polymerization technique or by a bulk-polymerization technique, and thereafter is water-dispersed or solubilized by partial or full neutralization with an organic amine or base and application of high shear agitation. In the second stage, a mixture of polymerizable monomers and polymerization catalyst is added to the first-stage emulsion at an elevated temperature to effect polymerization of the second-stage monomers, resulting in the formation of an emulsion coating composition. Such a coating composition is thus said to be "surfactant-free".

U.S. Pat. No. 4,179,417 to Sunada et al. discloses a composition for water-based paints, such composition containing a water-soluble resin and a water-dispersible polymer. The water-soluble resin contains 50-99.5 percent by weight of either an alpha, beta monoethylenically-unsaturated acid alkyl ester or an alkenyl benzene; 0.5-20 percent by weight of an alpha, beta monoethylenically-unsaturated acid; and 0-30 percent by weight of a hydroxyalkyl ester of an alpha, beta monoethylenically-unsaturated acid. These monomers are polymerized in the presence of at least one unsaturated compound selected from the group consisting of an alkyd resin containing a polymerizable unsaturated group, an epoxy ester containing a polymerizable unsaturated group, a drying oil, a fatty acid of a drying oil, and a diene polymer. The resulting polymers are water-solubilized by the addition of ammonia or an amine. The water-dispersible polymer contains not only hydroxy and/or carboxyl functional groups but also an alpha, beta monoethylenically-unsaturated acid monomer and/or a hydroxy alkyl ester of such a monomer as well as certain other ethylenically-unsaturated monomers. The compositions disclosed in U.S. Pat. No. 4,179,417 are employed in water-based paints and can optionally contain a cross-linking agent.

Canadian Pat. No. 814,528 to Kaminski discloses low molecular weight alkali-soluble resin, resin solutions and methods for their preparation and purification. The disclosed resins are said to be especially useful as emulsifiers, leveling agents, and film-formers. Kaminski discloses that the number-average molecular weight of such a resin ranges from 700-5000 and that such a resin can have an acid number which ranges between 140-300. The resins are further disclosed as being useful as emulsifiers in the preparation of emulsion polymers, resulting in emulsion polymers that are said to be stable and substantially free from coagulum. In connection with such a use, i.e. use as an emulsifier in an emulsion-polymerization reaction, the resins are said to require a number-average molecular weight of between 1,000 and 2,000 and preferably between 1,000 and 1,500. Resins having a number-average molecular weight greater than 2,000 are said to lead to unstable and coagulated emulsion polymers when used as the emulsifier in a conventional emulsion-polymerization reaction.

Two-stage latex polymers are known to exist in many morphological forms, which are determined by many factors including the relative hydrophilicity, miscibility and molecular weights of the first-stage and second-stage polymers.

So-called "core-shell" latexes are formed when such a second-stage polymer forms a "shell" (or coating) around a discrete "core" (or domain) of the first-stage polymer. Examples of such core-shell latexes are disclosed in U.S. Pat. No. 4,515,914 to Tsurumi et al., where an exemplary composition containing a first-stage styrene/butadiene polymeric core is encapsulated by a second-stage monovinyl polymeric shell.

So-called "inverted core-shell" latexes are also known. Lee and Ishikawa, in an article entitled "The Formation of 'Inverted', Core-Shell Latexes," and appearing in J. Poly. Sci., 21, 147-154 (1983), shows that such "inverted" latexes are those where the second-stage polymer becomes the "core" domain and is encapsulated by the first-stage polymeric shell. These inverted latex compositions can be formed when the first-stage polymer is more hydrophilic than the second-stage polymer. Lee and Ishikawa studied the formation of the "inverted" core-shell morphology using two polymer pairs: a soft polymer pair [ethyl acrylate/methacrylic acid (EA/MAA) (90/10)]/[styrene/butadiene (S/B)(60/40)] and a hard polymer pair [EA/S/MAA (50/40/10)]/[S (100)]. The ratio of monomers in each polymer is in parts-by-weight. Soft polymers have a relatively low glass-transition temperature (Tg), generally below about 20 degrees Celsius, while hard polymers have a relatively high Tg, generally above about 20° C. It was found, in the case of the soft polymer pair systems, that the formation of inverted core-shell morphology was equally complete regardless of the molecular weight of the hydrophilic polymer molecules, whereas in the case of the hard polymer pair systems it was found that the efficiency of inversion depended upon the molecular weights of the hydrophilic and hydrophobic polymers. The Lee and Ishikawa study further suggests that the formation of inverted core-shell latexes depends not only on the hydrophilicity, the interfacial tension, and the molecular weight of the hydrophilic polymer molecules, but also on the extent of phase separation between the two polymers. Lee and Ishikawa also point out a particular "alkali-swellability" aspect of the first-stage polymer, in connection with those inverted emulsion systems which they investigate.

Muroi et al., in an article titled "Morphology of Core-Shell Latex Particles," and appearing in J. Poly. Sci., 22, 1365-1372 (1984), evaluated certain latex particles which are formed when either an ethyl acrylate-methacrylic acid (EA-MAA) containing mixture of a methyl acrylate-methacrylic acid (MA-MAA) containing mixture was polymerized in the presence of either poly methyl acrylate/methacrylic acid seeds or poly ethyl acrylate/methacrylic acid seeds. These investigators discovered (1) that the shell was composed of the more hydrophilic poly (MA/MAA) molecules which were relatively high in MAA content and (2) that the core was composed of both poly (MA/MAA) and poly (EA/MAA) molecules, with the thus-investigated copolymeric particles being relatively uniform from surface to center with respect to distribution of all other components (i.e., except for MAA). The monomer content of MAA, in particular, was found to increase in the direction of the shell surface.

More particularly, Muroi et al. studied five compositions, including one where the first-stage feed was MA/MAA (90/10) and the second-stage feed was EA/MAA (90/10). These investigators discovered that as the pH of the resulting latex was increased, as a result of the addition of NaOH, the optical density decreased, indicating complete dissolution of all the latex particles.

In view of the above, it is desirable to provide a stable latex emulsion that is capable of employing a relatively broad spectrum of hard and soft monomers wherein such monomers possess "acidic" as well as "basic" functionality.

SUMMARY OF THE INVENTION

The present invention is directed to a stabilized latex emulsion and the process for preparing it. The process comprises:

(a) preparing a hydrophilic, low molecular weight first-stage polymer by emulsion polymerization;

(b) conducting a second emulsion polymerization to produce a hydrophobic second-stage polymer under conditions sufficient to cause the second-stage polymer to partition into the first-stage polymer thus producing an inverted core-shell latex; then (c) adjusting the pH of the resulting inverted core-shell emulsion to dissolve the first-stage polymer, thereby creating a continuous aqueous phase consisting of the first-stage polymer and a discontinuous phase containing discrete stabilized particles of the second-stage polymer.

The latexes of this invention exhibit excellent mechanical properties as a result of the stabilization of the second-stage polymer. Many latexes of this invention exhibit superior coating properties for those applications known in the art. Such applications include uses in floor polish, varnishes, including water-borne graphic arts varnishes, paints, inks, adhesives, and the like.

DETAILED DESCRIPTION OF THE INVENTION

The polymer particles of this invention are broadly characterized as latex particles comprising a hydrophilic first-stage polymer dissolved in a continuous aqueous phase containing discrete domains of a hydrophobic second-stage polymer. As employed herein the term "hydrophilic" means that the polymer is capable of being dissolved in an aqueous medium upon adjustment of the pH. First-stage polymers containing acid-functional groups (i.e., possessing "acidic" functionality) will be solubilized upon addition of alkali; first-stage polymers containing basic functional groups (i.e., possessing "basic" functionality) will be solubilized upon addition of acid.

The term "hydrophobic" as used herein includes a polymer which will not be dissolved in any aqueous medium by adjusting the pH.

For purposes of this invention, the term "inverse core-shell latex" means a latex formed in a two-stage polymerization process wherein the second-stage polymer tends to form a "core" domain in the first-stage polymer. The first-stage polymer may encapsulate the second-stage polymer, or may form a "shell" around the second-stage polymer "core", or may incorporate the second-stage polymer into its swollen matrix. It is also possible to engraft a portion of the second-stage polymer to the first-stage polymer to further stabilize the first-stage polymer.

"Emulsion polymerization" as the term is employed herein is a process that requires a polymerizable monomer or polymerizable co-monomers, an initiator, and water as the continuous phase. This invention may also optionally utilize such commonly-used emulsion-polymerization ingredients as chain-transfer agents to regulate the molecular weight of the resulting first-stage polymer and/or second-stage polymer, as well as conventional free-radical polymerization catalysts and/or conventional cross-linking agents, if desired.

The first step in the emulsion polymerization process of this invention is selecting the monomers which will produce the hydrophilic first-stage polymer. The monomers should be selected so that there is at least one monomer from each of two monomer groups, namely (i) specified monomers that are at least partially water-insoluble and (ii) specified "acidic" or "basic" functional group-containing monomers.

As employed herein, the term "water insoluble monomers" is intended to include those monomers that form polymers which, upon pH adjustment, do not become appreciably water-soluble.

As employed herein, the term "functional group-containing monomers" includes those monomers that form polymers whose solubility characteristics become appreciably changed upon pH adjustment.

Typical monomers that are at least partially water-insoluble, for purposes of the present invention, are certain open-chain conjugated dienes as well as certain vinyl monomers such as monovinyl aromatic monomers.

More particularly, with respect to the hydrophilic first-stage polymer of the present invention, a suitable monomer that is at least partially water-insoluble is selected from the group consisting of styrene, methyl styrene, alpha-methyl styrene, ethyl styrene, isopropyl styrene, tertiary butyl styrene, ethyl methacrylate, methyl methacrylate, butyl acrylate, butyl methacrylate, 2-ethyl hexylacrylate, ethyl acrylate, vinyl acetate, methyl acrylate, open-chain conjugated dienes, 2-hydroxyethyl methacrylate, 2-hydroxyethyl acrylate, methylol acrylamide, glycidyl acrylate, glycidyl methacrylate, and combinations thereof. Preferably, the hydrophilic first-stage polymer is produced from a monoalkenyl aromatic monomer such as methyl styrene, alpha-methyl styrene, tertiary-butyl styrene or, most preferably, styrene.

With respect to the hydrophobic second-stage polymer of the present invention, a suitable monomer that is at least partially water-insoluble is selected from the group consisting of styrene, methyl styrene, alpha-methyl styrene, ethyl styrene, isopropyl styrene, tertiary butyl styrene, ethyl methacrylate, methyl methacrylate, butyl acrylate, butyl methacrylate, 2-ethyl hexylacrylate, ethyl acrylate, vinyl acetate, methyl acrylate, open-chain conjugated dienes, 2-hydroxyethyl methacrylate, 2-hydroxyethyl acrylate, methylol acrylamide, glycidyl acrylate, glycidyl methacrylate, an aromatic or an acrylate or a methacrylate having a functionality of at least 2, and combinations thereof.

One suitable aromatic monomer having a functionality of at least two, for example, is divinyl benzene. Suitable acrylate monomers having a functionality of at least two or greater, for example, include: 1,3-butane diol diacrylate; 1,4-butane diol diacrylate; ethylene glycol diacrylate; diethylene glycol diacrylate; triethylene glycol diacrylate; tetraethylene glycol diacrylate; 1,6-hexane diol diacrylate; pentaerythritol tetraacrylate; and trimethylol propane triacrylate. Suitable methacrylate monomers having a functionality of at least 2, for example, include: 1,3-butane diol dimethacrylate; 1,4-butane diol dimethacrylate; ethylene glycol dimethacrylate; diethylene glycol dimethacrylate; triethylene glycol dimethacrylate; tetraethylene glycol dimethacrylate; 1,6-hexane diol dimethacrylate; pentaerythritol tetramethacrylate; and trimethylol propane trimethacrylate.

As employed herein, the term "monovinyl aromatic monomer" includes those monomers wherein a radical of the formula

is attached directly to an aromatic nucleus containing from 6 to 10 carbon atoms, wherein R is hydrogen or a lower alkyl such as an alkyl having from 1 to 4 carbon atoms, including those monomers wherein the aromatic nucleus portion is substituted with alkyl or halogen substituents. Suitable monovinyl aromatic monomers, for purposes of the present invention, are styrene; alpha-methyl styrene; ortho-, meta- and para-methyl styrene; ortho-, meta- and para-ethyl styrene; O-methyl-para-isopropyl styrene; para-chloro styrene; para-bromo styrene; ortho, para-dichloro styrene; ortho, para-dibromo styrene; vinyl naphthalene; diverse vinyl(alkyl-naphthalenes) and vinyl(halonaphthalenes), and co-monomeric mixtures thereof.

The term "open-chain conjugated diene" is meant to include, for example, 1,3-butadiene, 2-methyl-1,3-butadiene, 2,3-dimethyl-1,3-butadiene, pentadiene, 2-neopentyl-1,3-butadiene and other hydrogen analogs of 1,3-butadiene and, in addition, the substituted 1,3-butadienes, such as 2-chloro-1,3-butadiene, 2-cyano-1,3-butadiene, the substituted straight-chain conjugated pentadienes, the straight-chain and branched-chain conjugated hexadienes, other straight and branched-chain conjugated dienes typically having from 4 to about 9 carbon atoms, and co-monomeric mixtures thereof.

The functional group-containing monomers of the present invention can have basic or acidic functionalities such as amino or carboxy functionality. Typical functional group-containing monomers include "acidic" group-containing monomers such as acrylic acid, methacrylic acid, other unsaturated acid monomers, and combinations of these, and "basic" group-containing monomers such as vinyl pyridines, amino acrylates and methacrylates, and combinations of these. Typical amines include the vinyl pyridines, dimethyl aminoethyl methacrylate and tert-butyl amino ethyl methacrylate.

The acrylic monomers employed in the process of the present invention include acrylic acid or methacrylic acid, either alone or admixed with at least one other unsaturated monomer such as an ester of acrylic or methacrylic acid, 2-hydroxyethyl methacrylate, methacrylonitrile, acrylonitrile, and the like, and combinations of these.

Other unsaturated acid monomers can also be substituted in minor part for the preferred acrylic acids of the present invention. Such unsaturated acid monomers include maleic acid, crotonic acid, fumaric acid, itaconic acid, vinyl benzoic acid, isopropenyl benzoic acid, and combinations thereof.

The glass-transition temperature (Tg) of the first-stage polymer is an important factor in achieving the desired film forming properties of a particular stabilized latex product. Therefore, monomers are selected such that the first-stage polymer will exhibit a Tg suitable for a particular end-use application.

The first-stage monomers are, accordingly, selected so that a hydrophilic first-stage polymer will be produced. Additionally, the monomers are selected with a view toward the ultimate use of the latex film that is to be produced as well as the chemical resistance required of the thus-produced latex film. If the resulting emulsion is to be crosslinked, for example, then crosslinkable monomers should be used to form the first-stage polymer.

Preferred monomer formulations for the first-stage polymer include ethyl acrylate (EA) and methacrylic acid (MAA) and, particularly, the combination 80 EA/20 MAA. Styrene (S) and acrylic acid (AA) form another preferred composition, particularly, the combination 60 S/40 AA. A third preferred monomer composition, for purposes of preparing the hydrophilic first-stage polymer, is methyl methacrylate (MMA), butyl acrylate (BA) and methacrylic acid (MAA), especially 58 MMA/30 BA/12 MAA.

Sufficient functional group-containing monomer is present to ensure that the first-stage polymer will dissolve upon adjustment of the pH. For this and other purposes, the ratio of water-insoluble monomer to functional-group monomer is from 20:1 to 1:3. A more preferred ratio is from 10:1 to 1:1. The most preferred embodiment is where the water-insoluble monomer to functional-group monomer ratio varies from 7:1 to 3:2.

A chain-transfer agent is preferably added to the first stage monomers during emulsion polymerization to regulate the molecular weight of the first-stage polymer. (As those skilled in the art well know, the addition of a chain-transfer agent will enable one to regulate not only the number-average molecular weight but also the weight-average molecular weight of the first-stage polymer.) The number-average molecular weight should generally not exceed about 20,000, otherwise the first-stage polymer will usually cause the system to become exceedingly viscous upon pH adjustment. However, employing higher molecular weight might be useful for some compositions, especially those where high viscosity is desirable.

As employed herein the phrase "molecular weight" refers to the number-average (Mn) molecular weight, unless indicated otherwise.

The first-stage polymer must be capable of dissolving upon proper adjustment of the pH. For this and other purposes, such as viscosity considerations, the preferred molecular weight for the first-stage polymer is from about 3,000 to 15,000. The most preferred molecular weight is from about 5,000 to 10,000.

Selection of appropriate chain-transfer agents for molecular weight control is important for obtaining homogeneous, low molecular weight polymers. Chain-transfer agents must be efficient, must exhibit high transfer activity, must produce controllable molecular weight distribution, and must not adversely affect the polymerization rates. Conventional chain-transfer agents which meet these standards, such as mercapto carboxylic acids having 2 to 8 carbon atoms, and their esters, may be employed. Examples of suitable chain-transfer agents, still more particularly, are mercaptoacetic acid, 2-mercaptopropionic acid, 3-mercaptopropionic acid, 2-mercaptobenzoic acid, mercaptosuccinic acid, mercaptoisophthalic acid and alkyl esters thereof, and combinations thereof. It may also be desirable to employ a mercapto monocarboxylic acid and/or a mercapto dicarboxylic acid containing 2 to 6 carbon atoms such as mercaptopropionic acid and the alkyl ester thereof, or the butyl or isooctyl ester of mercaptopropionic acid.

Other organic-type chain-transfer agents, including halogenated hydrocarbons such as bromoform, carbon tetrachloride and bromotrichloromethane, may also be desirable.

For example, when producing stabilized latex emulsion adhesives, the chain-transfer agent is preferably selected from the group consisting of bromotrichloromethane, butyl mercaptopropionate, dodecyl mercaptan, mercaptoethanol, octyl mercaptan, and combinations of these.

In general, there is a reduction in polymerization rate and an increase in steady-state monomer concentration with increasing addition levels of chain-transfer agent. Generally, no greater than about 6 mole percent (mol %) of chain-transfer agent is employed, based on total molar weight of the monomer charged. On the other hand, as the addition level of chain-transfer agent is reduced, both the polydispersity index or ratio as well as the molecular weight of the polymer tend to increase, because a lesser amount of chain-transfer agent results in a reduced level of chain-transfer activity. (For the meaning of "polydispersity ratio", please refer to U.S. Pat. No. 4,529,787 to Schmidt et al.) Accordingly, no less than about 0.5 mol % chain-transfer agent is normally employed. If it is desirable to make polymers of greater molecular weight and/or polydispersity values, then the amount of chain-transfer agent employed can be reduced to below 0.5 mol %, say, to at least about 0.3 mol %. Depending upon the end-use, however, it may be desirable to use from about 1-3 mol % of a chain-transfer agent.

The chain-transfer agent is normally added to the reaction mix incrementally, along with the monomers of the first stage. A portion of the chain-transfer agent may be added to a functional group-containing monomer precharge, usually in the same relative proportion as the functional group monomer. For most purposes, the precharge preferably contains about 10 weight percent (wt.-%) of the entire charge of chain-transfer agent. The choice of type and amount of chain-transfer agents, and their effects, are well known to those skilled in the art.

Initiation is a factor to consider in connection with the emulsion polymerization process; and choice of suitable initiator is important for the preparation of homogeneous products. For example, to enhance initiator efficiency, to provide desired polymerization rates, and to provide product of a particular fine-particle size, it may be preferable to gradually add initiator to a particular reaction mixture. Precharging initiator prior to the onset of polymerization, or rapidly adding initiator along with the monomers, may yield premature destruction of initiator from the high concentrations of radical thereby produced. Employing high polymerization temperatures may also induce early consumption of initiator. For the above and other purposes, low-temperature initiators are preferred. Best results are attained with persulfate initiators such as sodium persulfate or potassium persulfate or barium persulfate and, especially, with ammonium persulfate (APS). Mixtures of such initiators may also be employed.

In general, from about 0.25 to 2 wt.-% of initiator, based on the total weight of all initiator and monomer charged, is employed. The particular identity and quantity of initiator selected will of course depend, in part, upon the desired polymerization rate, the co-monomer addition rate, the polymerization reaction temperature, and the like.

If desired, a post-addition of initiator may be employed to drive the reaction to completion. The choice of type of initiator, and amount of initiator, as well as the effect will be apparent to those skilled in the art.

An emulsifier, typically an anionic emulsion-polymerization surfactant such as sodium lauryl sulfate, can be utilized to promote desired emulsion polymerization and to stabilize a particular polymerization reaction. Other emulsifiers, such as alkali metal sulfates, sulfonates and/or sulfosuccinic esters and so-called "nonionics", as well as combinations of these, can also be utilized.

The selection of the monomers that make up the hydrophobic second-stage polymer is important. These monomers can be selected from the group of monomers set forth hereinabove (described in connection with the first-stage polymer); however, such monomers as well as their relative ratios are selected so that the resulting polymer will not be water soluble upon pH adjustment. Further, the resulting second-stage polymer must be capable of partitioning into the first-stage polymer, so as to form "domains" on or within the first-stage polymer. Accordingly, the second-stage polymer must be relatively incompatible with the first-stage polymer.

The molecular weight of the second-stage polymers may also be modified or regulated by use of the chain-transfer agents discussed hereinabove. One function of the second-stage polymer may be to enhance film strength. For that purpose the molecular weight should be significantly higher than that employed for the first-stage polymer. Generally, molecular weights of 15,000 to 200,000 are acceptable for the second-stage polymers of this invention. Higher molecular weights, if desired, can be obtained by methods known in the art, such as cross-linking. Preferred molecular weights are from 20,000 to 150,000. The most preferred molecular weight range for the second stage polymer is 25,000 to 100,000.

In general, the weight ratio of first-stage polymer to second-stage monomer can range from about 1:20 to 1:1. Preferably, the ratio is from about 1:15 to 1:2. In the most preferred embodiments, the ratio of first-stage polymer to second stage monomer is from about 1:0 to 1:3.

In general, the process of the present invention is conducted at the temperature range for conventional emulsion polymerization, known to those skilled in the art. For most purposes, the reaction temperatures are maintained at about 70° C. to about 90° C. and preferably at about 80° C. Lower temperatures, if desired, may be utilized using re-dox polymerization techniques, as is well known to those skilled in the art. It is generally preferred that the second-stage monomers be polymerized at a temperature above the glass-transition temperature (Tg) for the first-stage polymer. This will soften the first-stage polymer, will permit the second-stage polymer to form domains therein, and will permit the first-stage polymer to flow more readily, the result being that the first-stage polymer will better encapsulate the second-stage polymer product.

To assist in stabilizing the polymer product, and to ensure completion of the reaction, it may be desirable to maintain the reaction mixture at the desired reaction temperature for a period of about 1 hour, or more, after the final additions of co-monomers, initiator, and chain-transfer agent.

The second-stage emulsion polymer is formed from monomers which polymerize so as to form a "hydrophobic" polymer, as defined hereinabove. Monomers similar to those employed for the first stage can be used in the second stage, except that lesser amounts of functional group-containing polymers are employed to prevent solubilization upon dissolution of the first-stage polymers. In this instance, it is preferred that the second-stage polymer contain no more than about 10 mol % of functional monomer.

Copolymers of monomers such as monovinyl aromatic monomers, monoethylenically-unsaturated carboxylic acids and esters thereof, conjugated dienes, acrylonitrile, vinyl acetate, vinyl dichloride, and the like, and combinations of these, can thus be employed as second-stage monomers. Because of considerations such as desired polymer properties, availability and compatability with the polymer formed (by polymerizing the aforementioned monomer charge), it has been found that copolymers of styrene and acrylate esters and/or methacrylate esters—such as methyl methacrylate, butyl methacrylate, 2-ethylhexyl acrylate, and the like, and combinations of these—are preferred.

In order to promote desired core-shell inversion, it may be desirable to adjust the pH of the first-stage polymer reaction mixture to swell and plasticize the first-stage polymer, thereby to promote second-stage polymer domain formation in the first-stage polymer. A plasticizer or a coalescing agent may similarly promote domain formation.

The reaction conditions for second-stage emulsion polymerization reaction are similar to those of the first-stage reaction, at least with regard to initiator, chain-transfer agent, emulsifier, and reaction parameters. After desired polymerization has occurred, the solids content of the resulting aqueous polymer latex can be adjusted to the level desired by adding water thereto or by distilling water therefrom. Generally, a desired level of polymeric solids content is from about 20 to about 65 wt.-%, and preferably from about 30 to about 55 wt.-%, on a total weight basis.

In selecting reaction conditions for the second-stage polymerization reaction, it should be understood that sufficient initiator may still be present from the first-stage reaction to conduct the second-stage reaction. Addition of more chain-transfer agent may, however, be necessary to bring about the desired second-stage polymerization reaction, depending upon the desired molecular weight of the second-stage polymer. On the other hand, use of additional emulsifier is often unnecessary in the second-stage polymerization reaction.

Those skilled in the art will therefore appreciate that reaction parameters and adjuvants can be modified, as needed, to provide optimum second-stage reaction conditions.

The emulsion-polymerization process can, moreover, be conducted as a batch process, or as a semi-continuous process, as desired.

Further, the addition rate of first-stage monomer may be important, particularly if there is difficulty in obtaining uniformity of composition, for example, due to the tendency of certain monomers to partition to different phases. A particular example is a first stage of styrene and acrylic acid wherein monomer-starved conditions are necessary. In such a case, a one-hour addition may be unsatisfactory, whereas a three-hour addition might be preferable. Usually, an addition rate of about 0.5 to about 4 hours is sufficient for most semi-continuous polymerization reactions, dependent, of course, on the type and amount of initiator, the monomers employed, and the polymerization rate, as is well known to those skilled in the art.

The rate of addition of the second-stage monomer may also be important. Providing a high rate of second-stage monomer addition may make the first-stage polymer more soluble. This can affect morphology and grafting. Similar rates of addition, as compared to first-stage addition, are normally employed but this also depends on polymerization rates.

Once the inverted core-shell latex has been formed, the pH of the emulsion is adjusted to dissolve the first-stage polymer. If acidic functional group monomers are selected for the first-stage polymer, addition of a suitable base is appropriate. If basic functional group monomers are selected for the first-stage polymer, addition of an acid is appropriate.

Suitable bases which can be used to adjust the pH include organic and inorganic bases. Examples of suitable organic bases include amines, morpholine, and alkanol amines. Examples of suitable inorganic bases include ammonia, NaOH, KOH, and LiOH.

Suitable acids for adjusting pH include various known organic and inorganic acids such as acetic acid, hydrochloric acid, and phosphoric acid.

The rate of addition of the base or acid to the latex emulsion is usually not important. Sufficient base or acid should be added to achieve dissolution of the first-stage polymer. The degree of dissolution of the first-stage polymer can be estimated by measuring the change in optical density (O.D.) of the emulsion before and after addition of the pH-adjusting agent.

For various applications, it is sometimes desirable to employ small amounts of various known additives in the latex. Typical examples of such additives are bacteriocides, antifoamers, etc. Such additives can be added in a conventional manner to such latexes.

The resulting stabilized emulsion can be used to produce a variety of coatings known in the art, including films, polishes, varnishes, paints, inks, and adhesives.

The process of this invention can typically be conducted as semi-continuous polymerization as follows. Unless otherwise specified, percentages shall refer to weight percent.

GENERAL PREPARATION EXAMPLE

Internally subjected to a nitrogen ($N_2$) atmosphere, a suitable reactor is filled with water and emulsifier and stirred until a homogeneous solution is formed. The solution is heated, utilizing conventional heating equipment, to the desired reaction temperature.

The first-stage monomers and chain-transfer agent are combined to produce a first-stage mixture. A precharge of about 15% of the first-stage mixture is introduced into the reactor. An initiator, dissolved in water, is thereafter added into the reactor to induce the precharge to polymerize.

The balance of the first-stage monomers and chain-transfer agent are thereafter slowly added to the reaction mixture, over a time period of about 20 minutes to 2 hours.

Assuming that an acidic monomer is included in the first-stage mixture, the pH of the first-stage emulsion-polymerization reaction mixture is optionally raised to about 4.5 to 7 to cause the first-stage polymer to "swell" (If a desired second-stage polymerization mixture has not been prepared beforehand, such can now be prepared.)

Thereafter, and over a time period of about 60 minutes, the second-stage polymerization mixture (of second-stage monomers) is added at the desired reaction temperature. After a short holding period of about 5 to about 30 minutes, the pH of the reaction mix is slowly raised (over ca. 50 minutes) to about 8 to 10 to release the first-stage polymer into solution.

Alternatively, it might be desirable to prepare a so-called "master" batch of first-stage polymer and subsequently utilize such in conjunction with certain desired second-stage polymerization reactions.

The following examples are intended to better illustrate the invention but are not intended to limit the scope thereof.

EXAMPLE 1

To a 1-liter round-bottom flask fitted with a paddle stirrer and containing 500 g of $H_2O$ at 80° C. under a $N_2$ atmosphere was added 0.5 g of the emulsifier sodium lauryl sulfate. Next, 1.0 g of the free-radical initiator $(NH_4)_2S_2O_8$ was added to the flask. First-stage monomer, namely 80 g of ethyl acrylate (EA) and 20 g of methacrylic acid (MAA), was added over a time period of 30 minutes, along with the addition of 2.0 g of the chain-transfer agent butyl mercaptopropionate. The monomer-containing mixture was then held at 80° C. for approximately 15 minutes. The second-stage monomer, namely 100 g of methyl methacrylate (MMA), was added into the thus-heated monomer-containing mixture over a time period of 30 minutes. The resultant mixture was thereafter held at 80° C. for 1 hour with stirring. The pH of the stirred mixture was approximately 2.5, and the optical density (O.D.), measured on a Bausch and Lomb Spec 70 unit (at 500 nm in a 10 mm cell at 0.2% N.V.) was found to be 1.4.

Next, the pH was adjusted to 9.5 using a 28 weight-percent aqueous ammonium hydroxide solution (28 wt.-% aq. $NH_4OH$ soln.). The second-stage MMA polymer was stabilized by dissolution of the first-stage EA/MAA polymer. The O.D. after pH adjustment was found to be 0.37.

The relative O.D. values of the thus-produced emulsions as well as the actual size of the relative emulsion polymer particles were reduced, which provided evidence of dissolution of the inverted first-stage shell.

EXAMPLE 2

The procedure of Example 1 was followed, except that 100 g of styrene (S) was used as the second-stage monomer in place of the 100 g of MMA. Similar results were obtained; and an emulsion latex was formed. When the O.D. was measured at a pH of approximately 2.5, the O.D. was found to be greater than 2. After adjustment to approximately pH 9, the O.D. was found to be reduced to 0.82.

EXAMPLE 3

The procedure of Example 1 was again followed, except that no emulsifier was added to the first-stage polymerization step. Similar results were obtained. When measured at a pH of approximately 2.5, the O.D. was found to be 0.4. After adjustment to approximately pH 9, the O.D. was found to be 0.18.

EXAMPLE 4

To provide a clear model to show inverse core/shell emulsion polymerization and also to obtain additional confirmation of release and stabilization of the domains by base solubilization of the first stage, a monomodal first-stage alkali-soluble emulsion polymer was formulated as follows. Such an emulsion was made via a so-called "seeded" approach, wherein a fine particle size 80/20 EA/MAA polymer, made by emulsion-polymerization techniques, was used as the "seed" for the second-stage manufacturing step of the same composition.

The resulting alkali-soluble, relatively low molecular weight thus-produced "seed" was then characterized, at low and high pH, utilizing known transmission electron microscopy (T.E.M.) techniques and was shown to be both monodisperse, 94 nm (nanometers), and alkali-soluble. Such a seed was then utilized in connection with second-stage monomers of both styrene (S) and methyl methacrylate (MMA) at 5:1 and 1:1 S/MMA weight ratios, and resultant mixtures were subjected to emulsion polymerization.

When measured at a pH of approximately 2.5, the O.D. of each such mixture was found to be 1.1. After adjustment to approximately pH 9, the O.D. of each such mixture was found to be 0.66.

The resulting emulsions were then characterized by known T.E.M techniques. In all cases, phase inversion was noted. At high pH, the EA/MAA first-stage polymer was shown to be in a dissolved state and the discrete second-stage domains remained. These results correlated well with the particle size distributions at low and high pH. The distributions tended to show lower, monomodal particle sizes at high pH, indicating the presence of the second-stage domains after the EA/MAA phase was solubilized. The T.E.M. analytical results also correlated well with the observation of the lower O.D. value of the emulsions after the pH was raised from 2.5 to 9.

EXAMPLE 5

To a 1-liter round-bottom flask equipped with a conventional paddle stirrer, and internally subjected to a $N_2$ atmosphere, was added 48 g of water and 0.8 g of sodium lauryl sulfate emulsifier (28%). These ingredients were then mixed until homogeneous, while heating to a temperature of 80° C.

The following first-stage monomers were next combined along with 2.6 g of the chain-transfer agent bromotrichloromethane, to produce a first-stage monomer mixture:

| | | |
|---|---|---|
| Methyl methacrylate | 76.7 g |
| Butyl acrylate | 19.8 g |
| 2-Ethylhexyl acrylate | 19.8 g |
| Methacrylic acid | 15.9 g |

Fifteen percent, namely 20.2 g, of the thus-produced first-stage monomer mixture was then added to the reaction flask, as a pre-charge. With the temperature of the flask contents at 80° C., 2 g of the initiator ammonium persulfate (APS), pre-dissolved in 5 g of water, was added to the reaction flask.

After reacting the pre-charge ingredients at 80° C. for 10 minutes, the balance of the chain-transfer agent-containing first-stage monomer mixture was added to the flask, over a time period of 30 minutes, while maintaining the desired 80° C. reaction temperature.

After the addition of the remainder of the first-stage monomer mixture to the flask was completed, the resultant reaction mixture was held at 80° C. for one additional hour. Then, a premix of 10.1 g of an 80% aqueous solution of 2-dimethylamino-2-methyl-i-propanol, 1.4 g of 28 wt.-% aq. $NH_4OH$ soln., and 20 g of water was added to the reaction mixture, using the same feed rate as for the first-stage monomer mixture. After such addition was completed, the resultant reaction mixture was then held at 80° C. for 5 minutes. The pH was thereafter found to be 7.0-7.5.

While the first-stage polymer mixture was reacting, the following second-stage monomer mixture was prepared:

| | | |
|---|---|---|
| Methyl methacrylate | 91.4 g |
| Butyl methacrylate | 157.5 g |
| 2-Ethylhexyl acrylate | 66.5 g |

The second-stage monomer mixture was then added to the thus-neutralized first-stage polymer mixture, over a time period of 60 minutes, at a temperature of 80° C. After such addition of the second-stage monomer mixture was completed, the resultant batch was held at a temperature of 80° C. for 5 minutes.

Next, a pre-mix of 5.6 g of 28 wt.-% aq. $NH_{40}H$ soln. and 20 g of water was added at the same feed rate as for the second monomer feed. The resultant reaction mixture was then maintained at 80° C. for 50 minutes.

The resulting latex emulsion was thereafter cooled and filtered. The emulsion was observed to exhibit the characteristics of an "inverted" core-shell emulsion, within which the first-stage polymer had become solubilized.

EXAMPLE 6

The procedures of Example 5 were again followed, except that the following second-stage monomers were employed:

| | | |
|---|---|---|
| Methyl methacrylate | 28.4 g |
| Styrene | 63.0 g |
| Butyl methacrylate | 157.5 g |
| 2-Ethylhexyl acrylate | 66.1 g |

Results similar to Example 5 were obtained.

EXAMPLE 7

A latex for use in a floor polish, which can provide both the low molecular weight leveling resins and the high molecular weight colloidal components, can be made from the latexes produced according to the present invention, using known procedures and formulations.

As an example, an emulsion polymer was prepared according to the above general preparation example (2-hour first-stage monomer addition) utilizing the following raw materials:

Step 1: Preparation of Emulsion Polymer

| | | |
|---|---|---|
| Stage 1 monomers: | | |
| Styrene | 72.0 g |
| Acrylic Acid | 48.0 g |
| Iso-octyl Mercapto propionate | 4.8 g |
| Stage 2 monomers: | | |
| Styrene | 210.0 g |
| Butyl Acrylate | 56.0 g |
| Methacrylic Acid | 14.0 g |
| Aqueous phase: | | |
| Sodium Lauryl Sulfate | 12.0 g |
| Ammonium Persulfate | 4.0 g |
| De-ionized Water | 575.0 g |

Step 2: Floor Finish Prepared Employing Step 1 Polymer

An 18.7% non-volatile, high-gloss floor polish was formulated, in a conventional manner, from the above emulsion. The ingredients are listed below;

| Ingredients | | |
|---|---|---|
| Water | 121.4 g |
| Non-ionic emulsifier* (Triton X 405) | 2.5 g |
| 1% Fluorocarbon Leveling Surfactant (Zonyl FSJ) | 1.3 g |
| 28% $NH_4OH$ (aq. soln.) | 5.8 g |
| Oleic Acid | 1.3 g |
| 26% Non-volatile Wax Emulsion (a 1:1 blend of AC-392 and Eplene E-43 | 39.8 g |

-continued

| Ingredients | |
|---|---|
| polyethylene waxes) 20% Zinc Ammonium Carbonate Solution | 3.0 g |
| Emulsion polymer | 72.6 g |

Footnote:
*The identified emulsifier, Triton X 405, is a commercially-available 70 wt. % soln. of a 40-EO octylphenol surfactant.

EXAMPLE 8

An architectural coating was prepared using the polymer prepared according to Example 5. The coating had the following formulation:

| Paint Base: | |
|---|---|
| Propylene Glycol | 176.3 g. |
| Disperse Ayd W22[1] | 29.39 g. |
| Drew Plus T4500[2] | 5.88 g. |
| Water | 53.78 g. |
| Titanium Dioxide (Kronos 2190) | 734.65 g. |
| Paint: | |
| Paint Base | 100.0 g. |
| Polymer From Example 5 | 216.0 g. |
| Anti-foam (BYK 073) | 0.6 g. |
| Dibutyl phthalate | 3.8 g. |

[1]"Disperse Ayd W22" is a blend of anionic and non-ionic surfactants, sold by Daniel Products, Jersey City, NJ.
[2]"Drew Plus T4500" is an anti-foam agent for water-based paints, based on mineral oil and a silica derivative, sold by Drew Ameroid.

The above paint possessed good gloss as well as good coating and adhesion properties.

The next three examples are directed to the production of adhesives.

EXAMPLE 9

A first-stage hydrophilic polymer emulsion was produced as follows. To a 2-liter round-bottom flask fitted with a conventional paddle stirrer and containing 580.7 g of water at 80° C. under a $N_2$ atmosphere was added 8.0 g of a first emulsifier, sodium lauryl sulfate, together with 8.5 g of a second emulsifier, sodium dodecyl diphenyl oxide disulfonate. Next, 2.0 g of the free-radical initiator $(NH_4)_2S_2O_8$ was added to the flask contents. Thereafter, first-stage monomers, namely, 310.0 g of ethyl acrylate (EA) and 78.0 g of methacrylic acid (MAA), were added to the agitated flask contents over a time period of 60 minutes, along with 7.8 g of the chain-transfer agent butyl mercaptopropionate. The monomer-containing agitated flask contents were then held at 80° C. for 30 minutes; and, thereafter, 5.0 g of a 28 wt.-% aq. $NH_4OH$ soln. was added, to maintain a pH value of from 5 to 6.

Next, the second-stage polymer was produced as follows. To a 2-liter round-bottom flask fitted with a conventional paddle stirrer and containing 366.7 g of water at 78° C. under a $N_2$ atmosphere was added 100 g of the first-stage hydrophilic polymer-containing emulsion along with 15 g of a 4-mole-EO nonyl phenol surfactant. Next, 1.3 g of the free-radical initiator $(NH_4)_2S_2O_8$ was added to the flask. Thereafter, second-stage monomer, namely 10 g of MAA, 433 g of butyl acrylate (BA), and 4 g of 1,4-hexanediol diacrylate, were simultaneously added to the agitated flask contents over a time period of 90 minutes. The resultant mixture was then held at 80° C. for one hour, while maintaining agitation. The pH of the thus-agitated emulsion was approximately 5.5 and the viscosity was approximately 75 centipoises (cps). Next, the pH of the thus-agitated emulsion was adjusted to 7.0-7.5, utilizing 5.0 g of the above-mentioned 28 wt.-% aq. $NH_4OH$ soln. With the addition of the $NH_4OH$ solution, the first-stage EA/MAA polymer particles were observed to dissolve in their emulsion and the viscosity of such an emulsion was observed to increase to approximately 1000 cps.

The thus-produced pH-adjusted second-stage polymeric emulsion was thereafter applied to commercially-available polyester film to provide a one-mil thick dry film of pressure-sensitive adhesive possessing so-called "removable performance" characteristics (i.e., the adhesive and so-called "face stock" onto which the adhesive is coated are together cleanly removable from a surface). The dried film was observed to have a glass-transition temperature (Tg) of minus 48° C. When the adhesive side of the adhesive-coated polyester film was applied to a stainless steel panel, such was observed to provide an initial 30-minute 180-degree peel value of 22 ounces per inch width. (PSTC-1, 180-degree peel, modified for residence time of 30-minutes dwell.) 24-hour aging of the polymeric adhesive on the stainless steel panel at 70° C. provided a peel value of 26 ounces or less. (PSTC-1, 180-degree peel, modified for a residence time of 24 hours at 70° C. The Polyken Tack value of the polymeric adhesive was observed to be 420 g or less per square centimeter (Polyken Probe Tack Test, A-1-1); and the rolling-ball tack (Rolling Ball Tack Test, PSTC-6) was observed to be 5 inches or less.

EXAMPLE 10

The procedure for Example 9 was repeated except that 4.3 g of diethylene glycol dimethacrylate was utilized to produce the second-stage polymer, in lieu of the 4.0 g of hexanediol diacrylate. An emulsion polymer, similar to that of Example 9, was formed. The initial 30-minute 180-degree peel value was determined to be 48 ounces per inch width; the 70-degree C., 24-hour aged 180-degree peel value was observed to be 110 ounces; the Polyken tack was observed to be 600 g per square centimeter; and the rolling-ball tack was observed to be 4 inches.

Thus, while Example 9 produced a "removable" pressure-sensitive adhesive, Example 10 produced a somewhat more "permanent" pressure-sensitive adhesive.

EXAMPLE 11

A heat-sealable (e.g., blister-pack) variety of adhesive was prepared as follows.

The above-discussed procedures of Example 9 were again followed to produce yet another quantity of the first-stage hydrophilic polymer emulsion.

Another second-stage hydrophobic polymer was then produced as follows.

To the 2-liter round-bottom flask, which was fitted with the conventional paddle stirrer and which contained 270 g of water at 78° C. under a $N_2$ atmosphere, was added 250 g of the first-stage hydrophilic polymer-containing emulsion along with 15 g of a 4-mole EO nonyl phenol surfactant. Next, 1.3 g of the free-radical initiator $(NH_4)_2S_2O_8$ was added to the flask. Thereafter, second-stage monomer, namely 10 g of MAA, 225 g of BA, and 150 g of methyl methacrylate (MMA), were simultaneously added to the agitated flask contents over a time period of 90 minutes to produce a second-stage monomer mixture. The thus-produced second-stage monomer mixture was then held at 80° C. for one hour, while maintaining agitation. The pH of the thus-agitated emulsion was approximately 5.5 and the viscosity was approximately 30 centipoises (cps). Next, the pH of the thus-agitated emulsion was adjusted to 7.0–7.5, utilizing 12.5 g of the 28 wt.-% aq. NH$_4$OH soln. With the addition of the NH$_4$OH solution, the first-stage EA/MAA polymer particles were observed to dissolve in their emulsion, and the viscosity of such emulsion was found to have increased to approximately 1900 cps. This emulsion was then reduced to 40 wt.-% solids with water, resulting in a viscosity of 85 cps. The pH-adjusted second-stage polymeric emulsion was thereafter applied to commercially-available so-called "SBS" paper stock to provide a dry film of heat-sealable adhesive. When the adhesive-coated paper stock was heat sealed onto rigid PVC blister stock for 1½ seconds, at 50 pounds (per square inch gauge) and at a temperature of at least 121° C., an adhesive bond was formed that required complete "fiber tear" (i.e., failure) of the SBS paper stock to separate the PVC blister material from the SBS paper stock.

What has been described herein is a novel, stable emulsion polymer and methods for preparing the same. It will be apparent that the foregoing examples illustrate certain preferred embodiments and are not limitative of scope. Thus, while the polymer and the methods of the present invention have been described with reference to preferred embodiments, the present invention is not limited thereto. On the contrary, alternatives, changes and modifications will become apparent to those skilled in the art upon reading the foregoing description. For example, as Examples 9 through 11 illustrate, the present invention can be utilized to prepare certain adhesives. Still other variations will be obvious to those skilled in this art. Accordingly, such alternatives, changes and modifications are to be considered as forming a part of the invention insofar as they fall within the spirit and scope of the appended claims.

We claim:

1. A process for producing a stabilized latex emulsion adhesive, which comprises the steps of:
   a) reacting adhesive latex-forming monomers under predetermined emulsion-polymerization reaction conditions to form a hydrophilic first-stage polymeric adhesive precursor;
   b) contacting the first-stage polymeric adhesive precursor with an effective amount of at least one hydrophobic adhesive latex-forming monomer under predetermined emulsion-polymerization reaction conditions to form a hydrophobic second-stage polymeric adhesive precursor, wherein a portion of the second-stage hydrophobic polymeric adhesive precursor partitions into the first-stage hydrophilic polymeric adhesive precursor thereby producing an inverted core-shell latex emulsion polymeric adhesive precursor; and
   c) adjusting the pH of the inverted core-shell latex emulsion polymeric adhesive precursor by an amount effective to dissolve at least a portion of the first stage hydrophilic polymeric adhesive precursor, the first stage hydrophilic polymeric adhesive precursor being dissolvable and the second-stage hydrophobic polymeric adhesive precursor being insoluble upon adjustment of pH, for thereby producing a stabilized latex emulsion adhesive comprising a continuous aqueous phase containing the first-stage hydrophilic polymeric adhesive precursor and a discontinuous phase containing discrete, stabilized particles of the second-state hydrophobic polymeric adhesive precursor.

2. The process according to claim 1, wherein the hydrophilic first-stage polymer is formed from at least one monomer that is at least partially water-insoluble, and a pH-sensitive functional group-containing monomer.

3. The process according to claim 2 wherein the monomer that is at least partially water-insoluble is selected from the group consisting of styrene, methyl styrene, alpha-methyl styrene, ethyl styrene, isopropyl styrene, tertiary-butyl styrene, ethyl methacrylate, methyl methacrylate, butyl acrylate, butyl methacrylate, 2-ethylhexyl acrylate, ethyl acrylate, vinyl acetate, methyl acrylate, open-chain conjugated dienes, 2-hydroxyethyl methacrylate, 2-hydroxyethyl acrylate, methylol acrylamide, glycidyl acrylate, glycidyl methacrylate, and combinations thereof.

4. The process according to claim 2 wherein the functional group-containing monomer is selected from the group consisting of methacrylic acid, acrylic acid, maleic acid, crotonic acid, itaconic acid, fumaric acid, vinylbenzoic acid, isopropenyl benzoic acid, vinyl pyridines, dimethyl aminoethyl methacrylate, tertiary-butyl amino ethyl methacrylate, and combinations thereof.

5. The process according to claim 2 wherein the ratio of the water-insoluble monomer to the functional group-containing monomer in the first-stage polymer is from about 20:1 to about 1:3.

6. The process according to claim 2 wherein the ratio of the water-insoluble monomer to the functional group-containing monomer in the first-stage polymer is from about 10:1 to about 1:1.

7. The process according to claim 2 wherein the ratio of the water-insoluble monomer to the functional group-containing monomer in the first-stage polymer is from about 7:1 to about 3:2.

8. The process according to claim 1 including employing a chain-transfer agent in the reacting step to regulate the molecular weight of the first-stage hydrophilic polymer.

9. The process of claim 1 wherein the second-stage hydrophobic polymer is formed from at least one water-insoluble monomer and an effective amount of a pH-sensitive functional group-containing monomer such that the second-stage polymer will not be solubilized upon dissolution of the first-stage polymer.

10. The process according to claim 9 wherein the water-insoluble monomer is selected from the group consisting of styrene, methyl styrene, alpha-methyl styrene, ethyl styrene, isopropyl styrene, tertiary-butyl styrene, ethyl methacrylate, methyl methacrylate, butyl acrylate, butyl methacrylate, 2-ethyl hexylacrylate, ethyl acrylate, vinyl acetate, methyl acrylate, open-chain conjugated dienes, 2-hydroxyethyl methacrylate, 2-hydroxyethyl acrylate, methylol acrylamide, glycidyl acrylate, glycidyl methacrylate, aromatics or acrylates or methacrylates having a functionality of two or greater, and combinations thereof.

11. The process of claim 1 wherein the second-stage hydrophobic polymer is formed from at least one insoluble monomer.

12. The process according to claim 1 including employing a chain-transfer agent in the contacting step to regulate the molecular weight of the second-stage hydrophobic polymer.

13. The process according to claim 8 wherein the chain-transfer agent is selected from the group consisting of butyl mercapto propionate, octyl mercaptan, mercaptoethanol, dodecyl mercaptan, bromotrichloromethane, and combinations thereof.

14. The process according to claim 12 wherein the chain-transfer agent is selected from the group consisting of butyl mercaptopropionate, octyl mercaptan, mercaptoethanol, dodecyl, mercaptan, bromotrichloromethane, and combinations thereof.

15. The process according to claim 1, further including the step of crosslinking the second-stage polymer.

16. The process according to claim 1 wherein the ratio of the first-stage polymer to the second-stage monomer is from about 1:20 to about 1:1.

17. The process according to claim 1 wherein the ratio of the first-stage polymer to the second-stage monomer is from about 1:10 to about 1:3.

18. The process according to claim 1 wherein the process is performed semi-continuously.

19. The stabilized latex emulsion adhesive produced in accordance with the process of claim 1.

20. A container which contains the stabilized latex emulsion adhesive of claim 19.

21. A substrate onto which the stabilized latex emulsion adhesive of claim 19 has been applied.

* * * * *

UNITED STATES PATENT AND TRADEMARK OFFICE
CERTIFICATE OF CORRECTION

PATENT NO. : 5,081,166
DATED : January 14, 1992
INVENTOR(S) : Kiehlbauch et al.

It is certified that error appears in the above-identified patent and that said Letters Patent is hereby corrected as shown below:

At col. 12, line 19, at col. 14, line 3, at col. 15, line 51, at col. 16, lines 2 and 3, and at col. 17, line 5, please delete the expression "$NH_{40}H$" and insert the expression -- $NH_4OH$ -- in place thereof.

Signed and Sealed this

Twenty-third Day of March, 1993

Attest:

STEPHEN G. KUNIN

Attesting Officer

Acting Commissioner of Patents and Trademarks